US010644537B2

(12) United States Patent
Krishnan et al.

(10) Patent No.: US 10,644,537 B2
(45) Date of Patent: May 5, 2020

(54) FAST SWITCHING BACK-UP POWER SUPPLY SYSTEM EMPLOYING RECHARGEABLE ELECTROCHEMICAL CELLS

(71) Applicant: NANTENERGY, INC., Scottsdale, AZ (US)

(72) Inventors: Ramkumar Krishnan, Scottsdale, AZ (US); Javier Eduardo Banuelos Solis, Scottsdale, AZ (US)

(73) Assignee: NANTENERGY, INC., Scottsdale, AZ (US)

( * ) Notice: Subject to any disclaimer, the term of this patent is extended or adjusted under 35 U.S.C. 154(b) by 226 days.

(21) Appl. No.: 15/948,005

(22) Filed: Apr. 9, 2018

(65) Prior Publication Data

US 2018/0301929 A1 Oct. 18, 2018

Related U.S. Application Data

(60) Provisional application No. 62/483,443, filed on Apr. 9, 2017.

(51) Int. Cl.
*H02J 9/06* (2006.01)
*H01M 8/0656* (2016.01)
(Continued)

(52) U.S. Cl.
CPC ............. *H02J 9/06* (2013.01); *H01M 8/0656* (2013.01); *H01M 8/08* (2013.01); *H01M 8/186* (2013.01);
(Continued)

(58) Field of Classification Search
None
See application file for complete search history.

(56) References Cited

U.S. PATENT DOCUMENTS 8,168,337 B2 5/2012 Friesen et al.
8,309,259 B2 11/2012 Friesen et al.
(Continued)

FOREIGN PATENT DOCUMENTS

JP 8-140287 A 5/1996
WO 2016/197109 A1 12/2016

OTHER PUBLICATIONS

International Search Report & Written Opinion of the International Searching Authority PCT/US2018/026672 dated Jul. 25, 2018.
(Continued)

*Primary Examiner* — Jared Fureman
*Assistant Examiner* — Joel Barnett
(74) *Attorney, Agent, or Firm* — Pillsbury Winthrop Shaw Pittman, LLP

(57) ABSTRACT

A back-up rechargeable battery supply system comprises communication linkages and a configuration of switches to allow battery back-up power to be provided by cells within a battery unit that are in a ready mode and to by-pass batteries that are in a non-ready mode, or maintenance mode. The unique configuration of switches and communication methods enables the back-up power to be provided very quickly to avoid disruptions in power to a load. Each battery cell has a charge and discharge switch and a power switch. Both the power switch and one of the charge or discharge switches must be closed to allow the battery cell to charge or discharge respectively. The by-pass switch may be controlled by the battery system control or by the cell controller and when closed, the cell may be bypassed from discharging or charging. The battery cells may be electrochemical cells such as metal air batteries.

14 Claims, 13 Drawing Sheets

(51) Int. Cl.
*H01M 8/08* (2016.01)
*H01M 8/22* (2006.01)
*H01M 12/08* (2006.01)
*H01M 8/18* (2006.01)
*H02J 7/00* (2006.01)
*H01M 10/44* (2006.01)
*H01M 10/42* (2006.01)
*H01M 4/42* (2006.01)
*H01M 12/06* (2006.01)
*H01M 10/46* (2006.01)

(52) U.S. Cl.
CPC ........... *H01M 8/225* (2013.01); *H01M 12/08* (2013.01); *H02J 7/0016* (2013.01); *H02J 9/061* (2013.01); *H01M 4/42* (2013.01); *H01M 10/4214* (2013.01); *H01M 10/44* (2013.01); *H01M 10/46* (2013.01); *H01M 12/06* (2013.01); *Y02B 90/14* (2013.01); *Y02E 60/128* (2013.01)

(56) References Cited

U.S. PATENT DOCUMENTS

| | | | |
|---|---|---|---|
| 8,384,351 B2 * | 2/2013 | Monden | H02J 7/0026 320/116 |
| 8,491,763 B2 | 7/2013 | Friesen | |
| 8,492,052 B2 | 7/2013 | Friesen et al. | |
| 8,659,268 B2 | 2/2014 | Krishnan et al. | |
| 8,877,391 B2 | 11/2014 | Friesen et al. | |
| 8,895,197 B2 | 11/2014 | Friesen et al. | |
| 8,906,563 B2 | 12/2014 | Friesen et al. | |
| 8,911,910 B2 | 12/2014 | Krishnan et al. | |
| 9,269,998 B2 | 2/2016 | Hayes et al. | |
| 2010/0001737 A1 * | 1/2010 | Kubo | H02J 7/0013 324/434 |
| 2010/0316935 A1 | 12/2010 | Friesen et al. | |
| 2011/0070506 A1 | 3/2011 | Friesen et al. | |
| 2011/0250512 A1 | 10/2011 | Friesen et al. | |
| 2012/0015264 A1 | 1/2012 | Friesen et al. | |
| 2012/0025769 A1 * | 2/2012 | Kikuchi | B60L 3/0046 320/118 |
| 2012/0068667 A1 | 3/2012 | Friesen et al. | |
| 2012/0098499 A1 | 4/2012 | Friesen et al. | |
| 2012/0139496 A1 | 6/2012 | Krishnan et al. | |
| 2012/0202127 A1 | 8/2012 | Friesen et al. | |
| 2012/0321969 A1 | 12/2012 | Friesen et al. | |
| 2013/0095393 A1 | 4/2013 | Friesen et al. | |
| 2013/0115523 A1 | 5/2013 | Friesen et al. | |
| 2013/0115525 A1 | 5/2013 | Friesen et al. | |
| 2014/0184161 A1 * | 7/2014 | Deal | H02J 7/0019 320/121 |
| 2017/0222275 A1 | 8/2017 | Krishnan et al. | |

OTHER PUBLICATIONS

International Preliminary Report on Patentability dated Mar. 26, 2019 issued in corresponding International Patent Application No. PCT/US2018/026672.

* cited by examiner

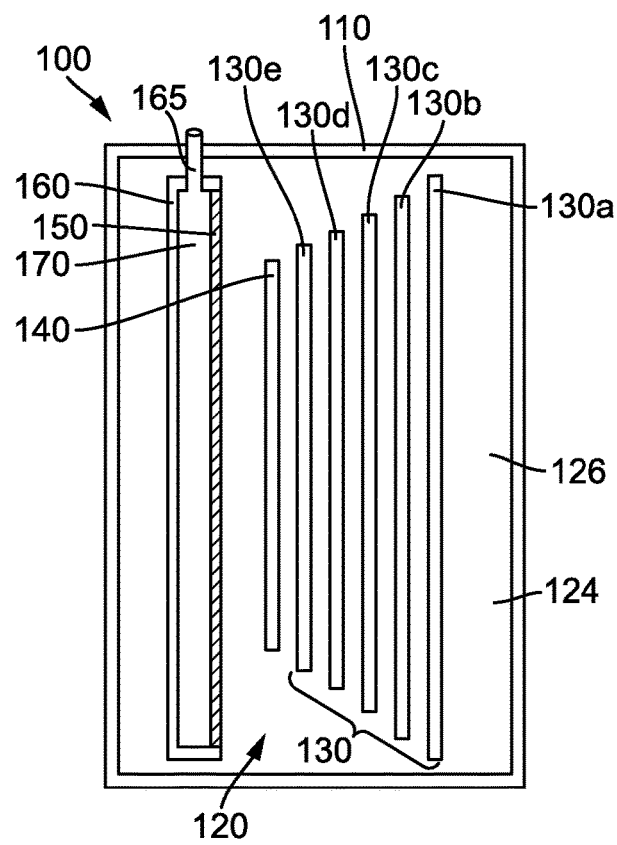
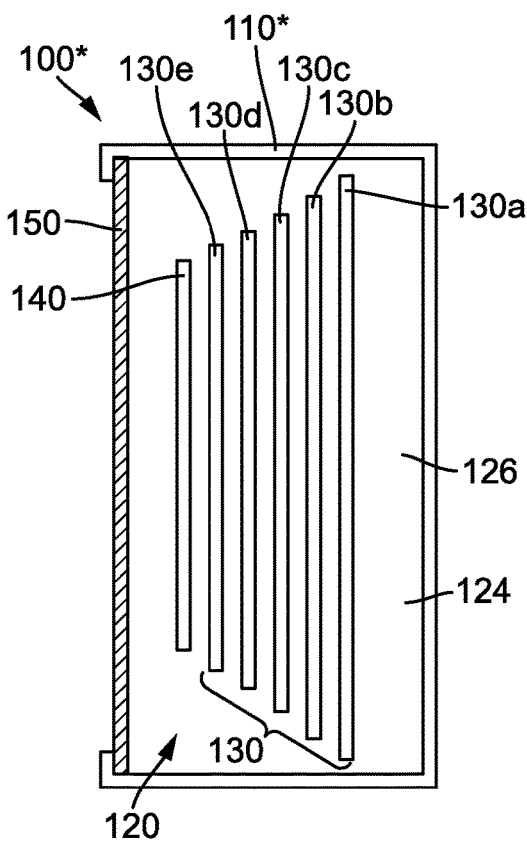
FIG. 13  FIG. 14

FAST SWITCHING BACK-UP POWER SUPPLY SYSTEM EMPLOYING RECHARGEABLE ELECTROCHEMICAL CELLS

The present application claims priority to U.S. Provisional Application No. 62/483,443, filed Apr. 9, 2017, the entirety of which is incorporated herein by reference.

BACKGROUND OF THE INVENTION

Field of the Invention

The invention relates to fast switching back-up power supply systems employing rechargeable electrochemical cells.

Background

Back-up power supply systems have to respond quickly when a primary power source is interrupted. When a primary power source goes down or has a drop in power supply levels, a loss of power to a load, even for a fraction of a second can be problematic, especially with today's complex computer systems.

In prior art back-up systems using batteries as the source of back-up power with connecting switches operated at the cell level, communication of the drop or loss in power is provided to a central controller, which in turn sends out a signal to the cells to activate their switches for connecting the batteries to the circuit. Because there may be a lag in bringing the batteries on-line to meet the power demands when a power loss occurs, high discharge rate capacitors are often used to avoid interruption. High discharge rate capacitors can discharge power extremely quickly, but typically have low energy density and are expensive.

High rate capacitors are also used for applications where the charging load can spike or saturate quickly before batteries can be brought on-line for charging/storage. For example, clearing of cloud coverage or changes in wind pattern may cause the energy available on a solar cell or wind turbine farm to rapidly increase beyond the needs of the grid it powers, and high charge rate capacitors are used to buffer the battery banks until sufficient capacity comes on line to accept the power delivered.

Rechargeable electrochemical cells have other specific characteristics that make utilizing them in a back-up power supply system challenging. Rechargeable electrochemical cells, such as metal-air cells, lead-acid batteries and lithium batteries, have to undergo maintenance in which the cell is taken off-line to prevent them from being coupled with the primary power source and/or load. Such maintenance may include load balancing, deep discharging, forced resetting, or the like. In addition, rechargeable electrochemical cells may have a reduced state of charge that is not sufficient to enable utilizing the cells in a power supply mode. Because each cell behaves individually, a fast responding back-up power supply utilizing such cells can pose unique problems.

Examples of designs in accordance with prior art techniques are discussed in the detailed description section with reference to FIGS. 1-3. These designs suffer the shortcoming that the transition of the cells to a state where they are ready to discharge or charge is managed by the system controller, which is slow and dedicated to various other functions that create possible delays in the transition.

SUMMARY OF THE INVENTION

One aspect of the present invention provides a back-up power supply system for use in conjunction with a primary electrical power source. The system comprises a primary power sensor configured to detect a characteristic of primary electrical power provided by the primary electrical power source to a load. The primary power sensor is configured to output a threshold signal, indicating a discharge mode or a charge mode based on the characteristic detected. The system also comprises a system controller and a battery system.

The battery system comprises a plurality of rechargeable battery cells arranged in series. Each cell comprises:
  (i) a cell controller;
  (ii) at least one ready state sensor coupled to the cell controller for sensing one or more conditions of the cell for determining if the rechargeable battery cell is in a ready charge mode for charging, and if the rechargeable battery cell is in a ready discharge mode for discharging;
  (iii) a cell bypass switch coupled to the cell controller, the cell bypass switch being switchable between a normal state for enabling said cell to be electrically coupled in said series and a bypass state bypassing the cell within the series; and
  (iv) a power switch switchable between a closed state electrically coupling the battery cell within the series to communicate power between the battery and the load and an open state electrically decoupling the battery cell from the series.

The primary power sensor is coupled in parallel to the system controller and each cell for transmitting the threshold signal directly thereto. This avoids passing the transmission of the threshold signal to the cells through the system controller. Each cell is configured to switch its power switch to the closed state in response to receiving the threshold signal. Each cell controller is also configured to switch the bypass switch between the bypass state and the normal state in response to the at least one ready state sensor.

Other means at the system level regulates the current and/or voltage output from or input to the cell, and the operation of the power switch (and possibly other switches) enables rapid transition of the available cells to a condition to charge or discharge, as may be applicable. For any cell not ready, the bypass switch function can be used to bypass that cell while maintaining the series.

In some embodiments, the primary power sensor may be coupled in parallel to the cell controller of each cell for transmitting the threshold signal directly thereto. In other embodiments, the primary power sensor may be coupled in parallel to dedicated circuits for managing the relevant switches at the cell level.

Other objects, features and advantages of the present invention will become appreciated from the following detailed description, the accompanying drawings, and the appended claims.

BRIEF DESCRIPTION OF THE DRAWINGS

The accompanying drawings are included to provide a further understanding of the invention and are incorporated in and constitute a part of this specification, illustrate embodiments of the invention and together with the description serve to explain the principles of the invention.

FIGS. 13 and 14 show exemplary electrochemical cells.

DETAILED DESCRIPTION OF THE ILLUSTRATED EMBODIMENTS

Figure 1:
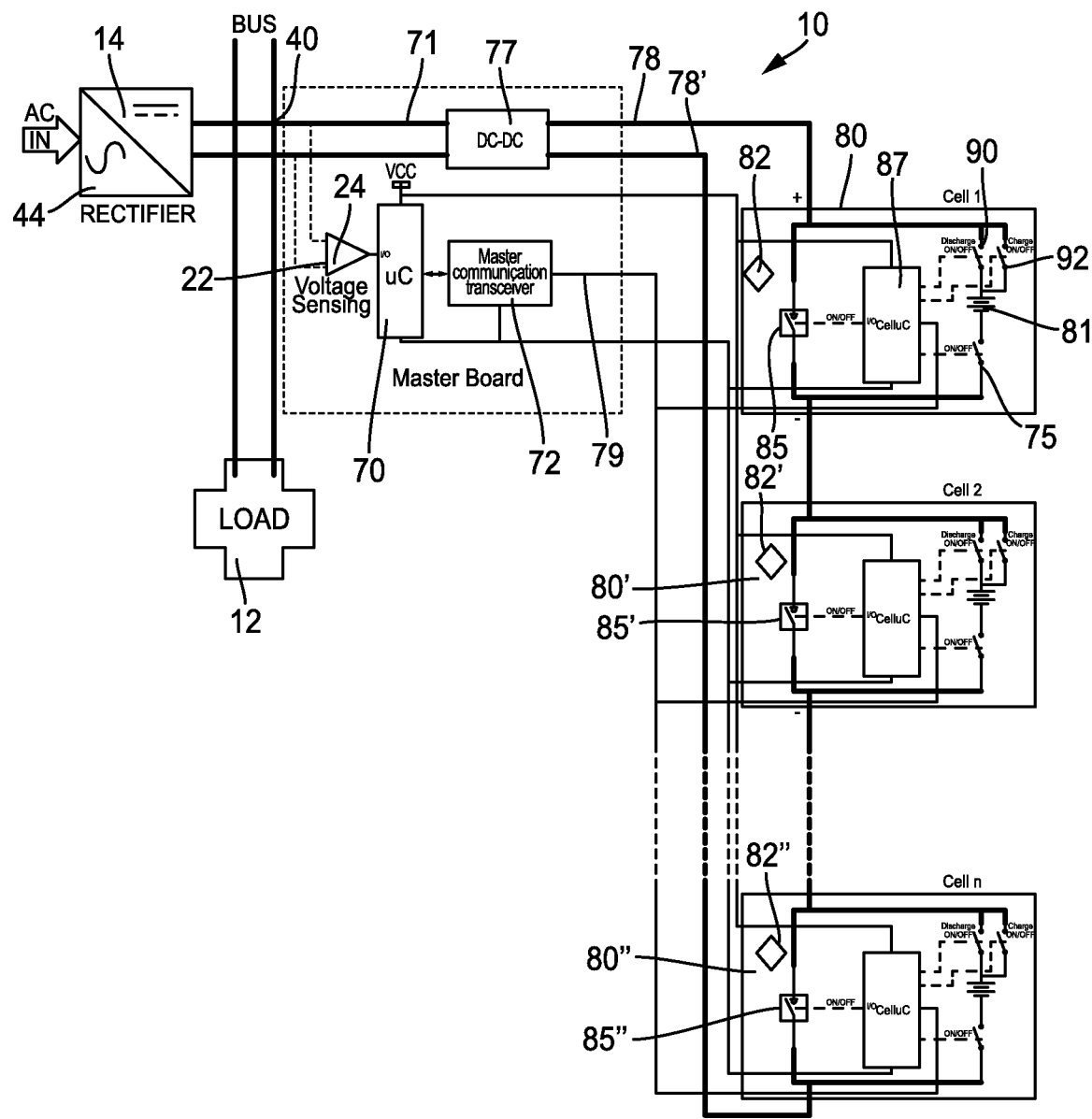
FIG. 1 shows a prior art back-up power supply system coupled to a load and configured to measure voltage of a primary power supply by a voltage sensor that is coupled to a controller that communicates with each cell.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

"Directly," as used herein in reference to communication or signal transmission, means that a communication is transferred from one element, such as a sensor or controller, directly to another element of the system, such as a controller, charge control circuit, discharge control circuit or inverter gate without passing through any additional controller or microprocessor responsible for other functions. Directly may include passing from the first element through a communication transceiver and the signal may be a wireless signal. The notion of direct communication is intended to exclude the signal passing through a component that can delay the transmission because of dedication to other processes. For example, the microprocessor or microcontroller of the system controller is generally responsible for a number of high level functions, and routing the threshold signal through that microcontroller may create an unacceptable delay.

Figure 2:
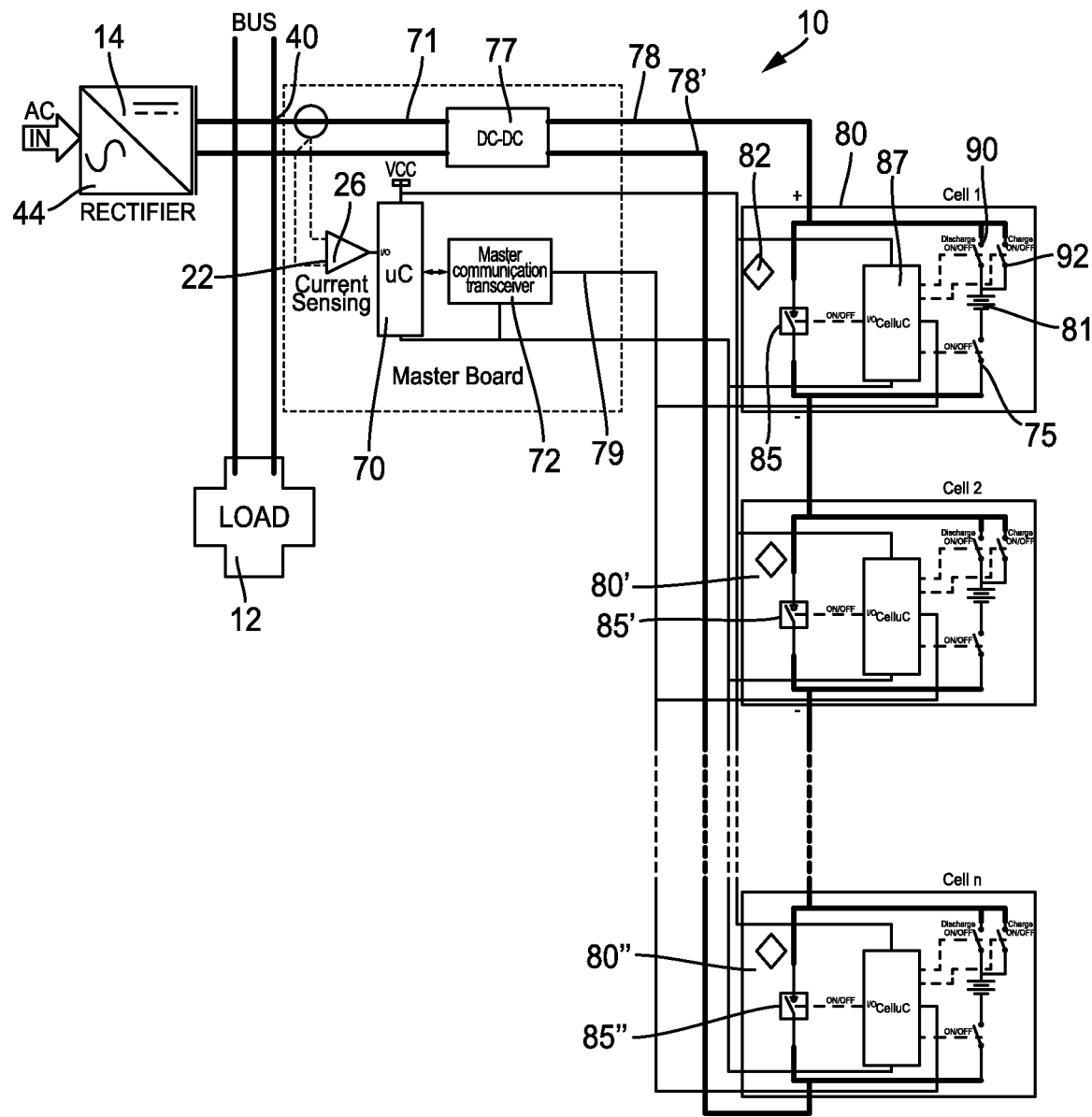
FIG. 2 shows a prior art back-up power supply system coupled to a load and configured to measure current of a primary power supply by a current sensor that is coupled to a controller that communicates with each cell.
Figure 3:
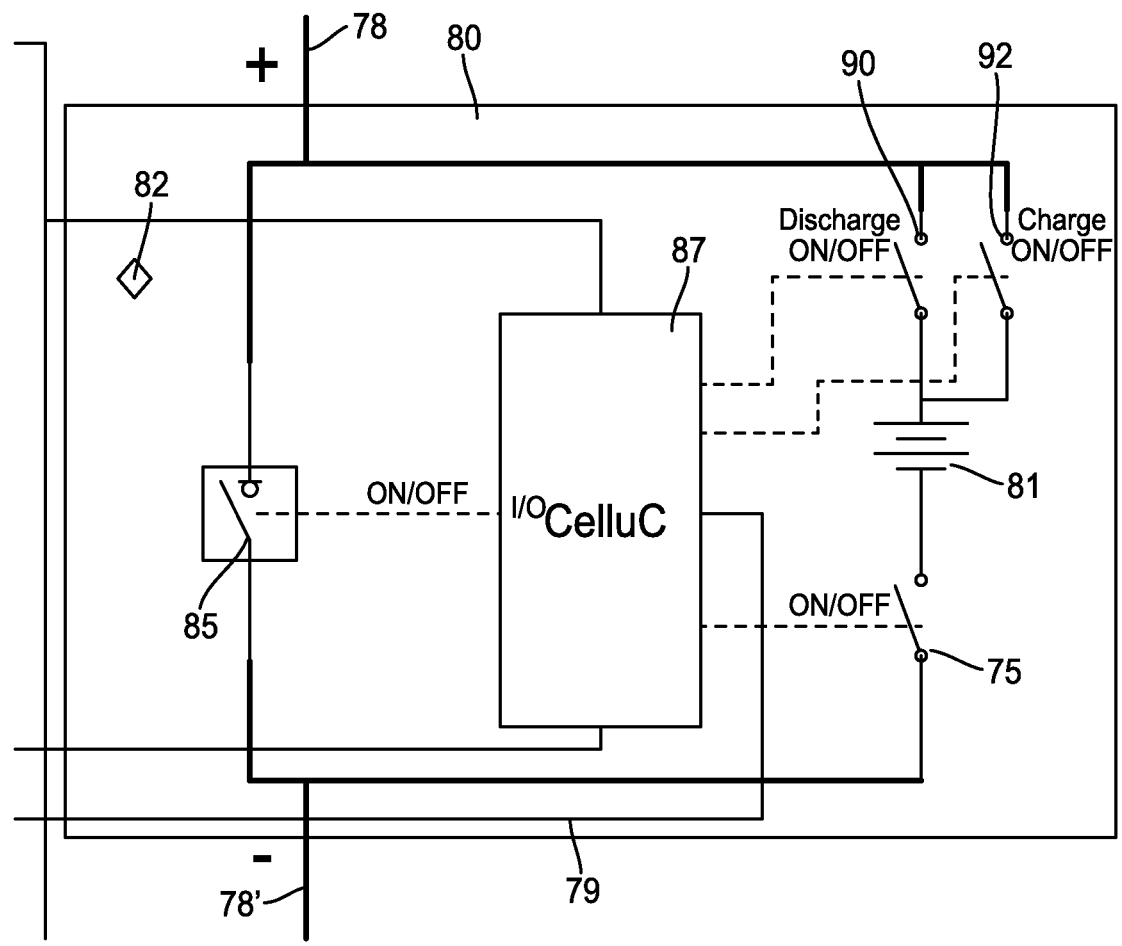
FIG. 3 shows a diagram of a prior art cell having a microcontroller, and a plurality of switches, a discharge switch and charge switch and wherein the cell receives a signal from a controller regarding the status of the primary power supply.

FIGS. 1-3 are provided as a reference to illustrate a control topology using a more conventional technique. As shown in FIGS. 1 and 2, an exemplary back-up power supply system 10 is coupled to a load 12 and configured to detect, such as by measuring a power level of a primary power supply 14 by a primary power source sensor 22. The primary power source sensor 22 is coupled to a controller 70 in the form of a microprocessor that communicates with each cell 80 to 80", each comprising a rechargeable battery 81. That controller 70 is at the system level, and is responsible for a wide variety of functions at the system level and collecting/sending data and commands to and from the individual cells. This controller 70 can also manage the power electronics for connection to the load/power source and DC-DC or DC-AC conversion. The primary power sensor detects a characteristic of the primary electrical power provided by the primary electrical power source to a load.

In FIG. 1, the primary power source sensor 22 is a voltage sensor 24 detecting voltage as the characteristic, and in FIG. 2 the primary power source sensor 22 is a current sensor 26 detecting current as the characteristic. Otherwise, these embodiments are generally the same.

A set of power lines 78, 78' electrically couple the battery cells to a BUS 40 which couples the battery cells to the primary power source 14 and the load 12. Where an AC power source is used, the AC signal may be converted to DC, such as by rectifier 44. When the primary power source sensor 22 detects a reduction in the primary electrical power below a threshold, for example a lower threshold level, the system controller 70 will send a command to cause the cell controllers to close their power switches 75 (for those cells that are ready to discharge and not bypassed in the manner discussed below) to couple the batteries in series to the load to supply battery power to the load. The same happens for charging, except that power is delivered to the series of connected cells. A power regulator 77 may control the electrical power produced by the battery system for supply to the load. For example, the load may be configured to receive power at 44-54 volts, and the power regulator may be used to control the amount of power delivered to the load. As an example, if the bus voltage drops to 30 volts, the power regulator may limit the voltage produced to 14-24 additional volts to maintain the bus voltage at an acceptable range to support the load. Likewise, if the power available to the load is higher, the regulator 77 may divert excess voltage to the cells for recharging purposes. This power regulator is conventional and well-known, and may be embodied in separate components, such as one regulator dedicated to charging and one dedicated to discharging. The operation of the power regulator(s) 77 is handled by the system controller 70.

The power regulator 77 may also include a power conditioner, such as a DC-DC or DC-AC converter, depending on the application. Alternatively, the power regulation (e.g., the ability to limit voltage or current output from or input into the cell series) and the power conditioning (e.g., signal conversion or matching) may be performed by separate components.

Each of the battery cells 80-80" has a ready state sensor 82-82" that measures one or more parameters of the battery that are used to determine if the battery is in a ready state for discharge mode or charge mode. The ready state sensor may determine if the battery cell is defective, and provide a signal to the cell controller and/or system controller to place the cell in a defect mode. The ready state sensor may also measure a state of charge of the battery and if the state of charge is too low, then the bypass switch 85 (and optionally power switch 75 and/or discharge switch 90) may be opened to prevent the battery being coupled with the load in a discharge mode. When the state of charge of the cell is above an upper threshold limit, the bypass switch 85 (and optionally power switch 75 and/or charge switch 92) may be opened to prevent the cell from going into charge mode, whereby overcharging can have detrimental effects on the battery cell. The ready state sensor provides input for determining if the cell is in a ready mode for charging or discharging and the primary power supply sensor 22 also provides input to the system for switching cells to a charge or discharge mode. The two sensors work in tandem to allow only cells that are in a proper ready mode to be coupled with the load or primary power supply.

The primary power source sensor 22 communicates with the battery system controller 70 and the battery system controller 70 communicates with each of the cells through a communication line 79. A communication transceiver 72, comprising a signal transmitter and in some case a signal receiver, communicates with the battery system controller 70 and with each of the cells. The communication line 79 couples the battery system controller 70 with the cell controllers 87. Each of the cells 80-80" has a cell controller 87 that receives communication signals from the battery system controller 70 and controls switches 75, 85, 90, 92 of the cells.

Each cell has a discharge switch 90. Each discharge switch 90 is switchable between a closed position for coupling the cell 80, 80', 80" to the series by the cathode thereof for discharging the cell, and an open position for decoupling the cathode from the series. In the example of a metal-air cell, the cathode is the air cathode.

Each cell also has a charge switch 92. Each charge switch 92 is switchable between a closed position for coupling the cell to the series by the charging electrode for charging, and an open position for decoupling the charging electrode from the series. In the example of a metal-air cell, the charging electrode may be an oxygen evolving electrode, such as a nickel based one.

Each cell also has a power switch 75. Each power switch 75 is switchable between a closed state electrically coupling the battery cell within the series to communicate power between the battery and the load, and an open state electrically decoupling the battery cell from the series. As can be seen in the drawings, the power switch 75 couples the cell to the series by the negative electrode, such as the metal (e.g., zinc) fuel electrode in a metal-air cell.

Each cell has a cell bypass switch 85 that is used to disengage or bypass the cell from charging or discharging, as described herein. The cell bypass switch 85 is coupled to the cell controller 87. The cell bypass switch 85 is switchable between a normal state for enabling the cell 80, 80', 80" to be electrically coupled in the series and a bypass state bypassing the cell within the series.

As shown in FIG. 3, the communication line 79 is coupled with the cell controller 87 and the cell controller 87 controls the opening and closing of one or more of the cell switches, i.e., the cell bypass switch 85, the power switch 75, the discharge switch 90 and/or the charge switch 92. The cell controller 87 may close the bypass switch 85 to put the cell in bypass mode when the cell is in a maintenance mode, service mode, non-ready mode or a fault mode. The use of such bypassed modes is known, for purposes of keeping a cell off-line for certain activities, such as deep discharging, replacement, resetting, etc., while allowing the remaining cells to remain connected in series.

The shortcoming of this prior approach, as mentioned above in the background section, is that the system controller 70 is responsible for sending the signal to trigger the cells to close their respective power switches, and to close the discharge or charge switch of each cell based on whether discharge or charge mode is being entered. Because the system controller 70 also has a number of other responsibilities, there can be a delay in supplying power or making capacity available for charging.

The following embodiments address that problem by using a more direct technique for switching the cells to a state for charge or discharge. Similarities between the topology in FIGS. 1-3 will not be repeated in detail.

Figure 4:
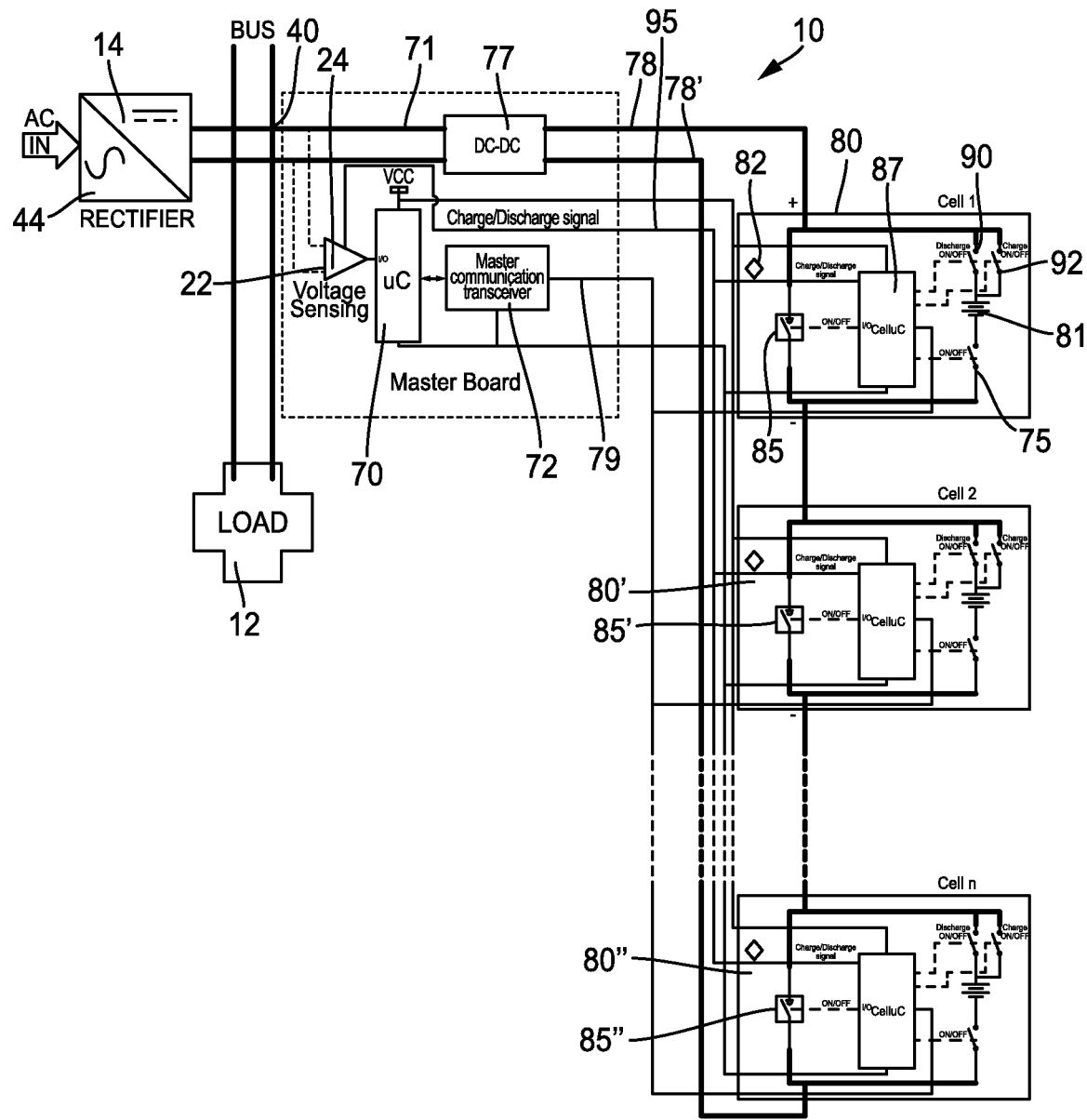
FIG. 4 shows an exemplary back-up power supply system embodiment of the invention coupled to a load and configured to measure voltage of a primary power supply by a voltage sensor that is coupled to each of the cell controllers.
Figure 5:
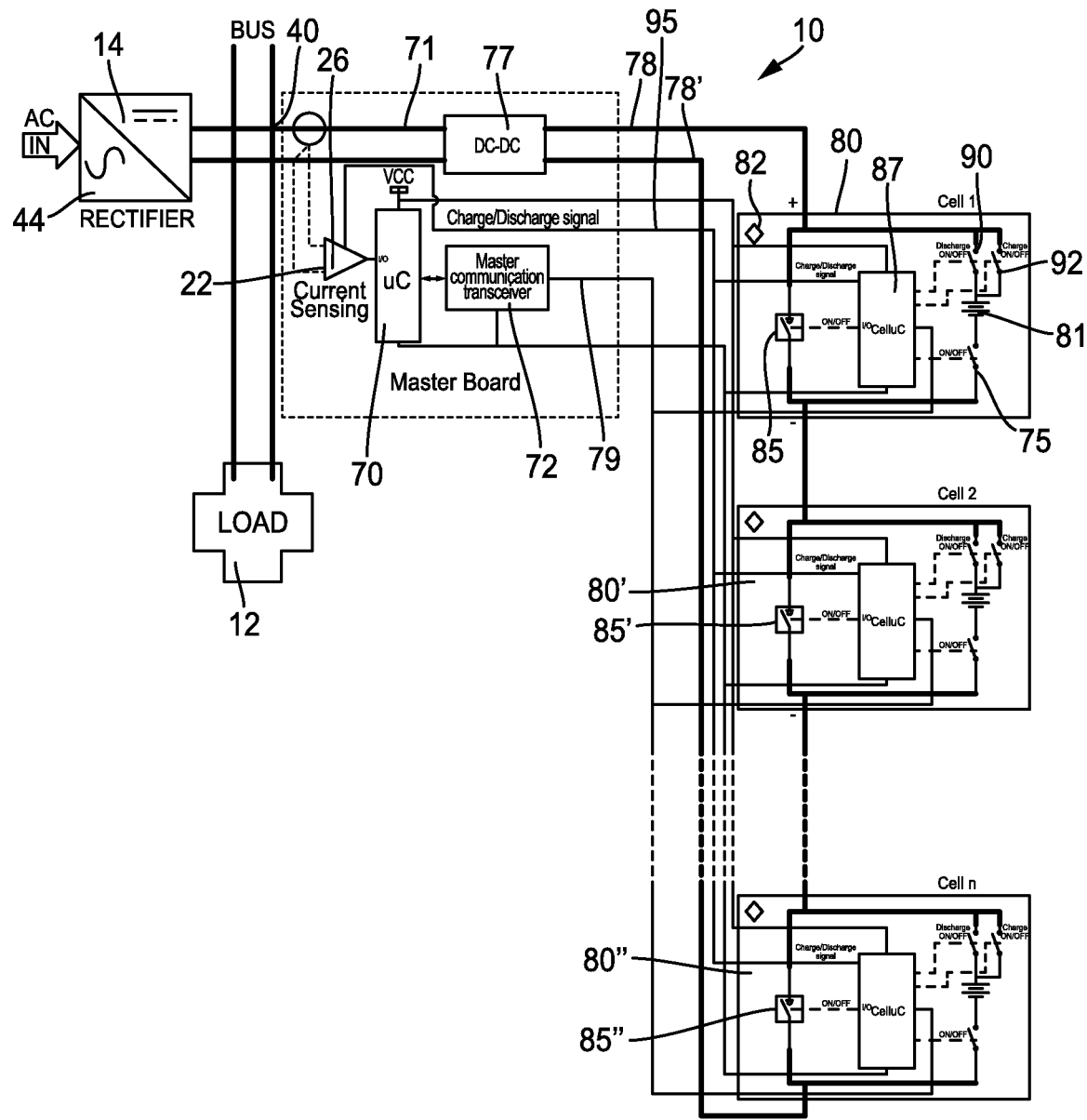
FIG. 5 shows another exemplary back-up power supply system embodiment of the invention coupled to a load and configured to measure current of a primary power supply by a current sensor that is coupled to each of the cell controllers.

As shown in FIGS. 4 and 5, an exemplary back-up power supply system 10 is coupled to a load 12 and configured to detect, such as by measuring, a characteristic of a power level of a primary power supply 14 by a primary power source sensor 22 (e.g., voltage or current). For example, in a grid application supplying power to a bank of computers as the load, the primary power source may detect a characteristic indicative of the power available on that grid to make an informed decision as to whether there is sufficient power to operate the computers, insufficient power requiring backup power from the batteries, or more than sufficient power such that there is excess that can used for charging the batteries. In a solar farm application, the electrical power source may be the amount of power output by the solar farm to an area wide grid as the load, and the sensor can detect a characteristic of the power generated by the solar farm to make the same informed decision. In different applications, differing priorities may be given to charging and discharging, or they may be of equal priority. In the computer example, keeping a level supply of power without interruption is critical, and thus such a system may be designed to react more quickly for discharge purposes. For a solar farm application, because spikes in output may occur that needs to be stored by the batteries, the system may be designed to react more quickly for charge purposes. In some systems both charge and discharge functions may be prioritized equally. Context for these differences will be mentioned below in reference to the bypass functionality.

The primary power source sensor 24/26 is directly communicated in FIGS. 4 and 5, such as by hard wiring, to each of the cell controllers 87 for cells 80'-80". Specifically, as shown in FIG. 4, the primary power source sensor is a voltage sensor 24 and as shown in FIG. 5, the primary power source sensor is a current sensor 26. The primary power source sensor is also directly communicated to the battery system controller 70. Thus, the primary power sensor 24/26 is coupled in parallel to the controller 87 of each cell and the system controller 70. Direct signals are transferred by a direct line 95 to each of the cells 80-80". In this embodiment, the cell controllers 87 are configured to (a) switch the power switch 75 and the discharge switch 90 to the closed states thereof in response to a threshold signal (discussed below) indicating the discharge mode and (b) switch the power switch 75 and the charge switch 92 to the closed states thereof in response to the threshold signal indicating the charge mode. Because the primary power source sensor 24/26 is connected directly to each of the cell controllers 87, the battery system controller 70 is bypassed. This provides higher speeds for switching to a battery power supply.

Either sensor 24/26 is configured to output a threshold signal that indicates a discharge mode or a charge mode for the system. The threshold signal is a signal emitted when the sensor 24/26 detects the relevant characteristic as passing an applicable threshold. Using voltage as an example, the sensor 24 may have a single threshold and output a threshold signal indicating a charge mode when the voltage is above the threshold, and a threshold signal indicating a discharge mode when the voltage is below the threshold. Multiple thresholds may be used, such as a higher threshold that triggers sending the threshold signal indicating the charge mode when the voltage exceeds it and a lower threshold that triggers sending the threshold signal indicating the discharge mode when the voltage drops below it. The threshold signal is thus a signal that indicates breaking of a threshold and whether that breaking indicates charge or discharge for the system. The threshold signal is a global or unitary command or data signal to which all the cells respond, in contrast to addressed signals that indicate the address for a specific cell and are intended for a specific cell. A global or unitary command allows one command to be sent in parallel to all cells, and to the system controller 70 also. The threshold signal may be as simple as a high/low data bit or a hardware type signal. At the system controller 70, the system will make decisions about how much power is required for a discharge event and operate the regulator 77 responsible for controlling and managing power output (or for a charge event it will do the inverse and decide how much power is available for charging).

When the primary power source sensor 24/26 detects a reduction in the primary electrical power below a threshold, or lower threshold level, it sends out a threshold signal indicating a discharge mode. The cell controller 87 in turn receives that signal and reacts accordingly. Preferably, primary power source sensor is connected to an interrupt input (also called an interrupt pin) of the cell controller 87, which triggers the responsive action as high priority and makes the process faster without waiting for the cell controller 87 to perform other processes that may delay the response. The cell controller's reaction to a threshold signal indicating the discharge mode is to close (i.e., switch it to its closed state) the power switch 75 and the discharge switch 90 to provide a flow of electrical power from the cell 80 to the load 12.

If the cell is in maintenance or a non-ready mode, including not being ready for discharge, the bypass switch 85 will be closed causing the cell to be bypassed wherein no power is provide from the cell to the load. In that case, the controller need not close the power switch 75 and the discharge switch 90. In fact, it is preferred (but optional) that it not do that, as such connections may permit some connectivity between the cell and the series.

As a result of that threshold signal indicating the discharge mode, this enables each cell available for discharge to make the appropriate switching connections rapidly and in parallel simultaneously.

Likewise, when the primary power source sensor 24/26 detects an increase in the primary electrical power above a threshold, such as an upper threshold level, it sends out a threshold signal indicating a charge mode. The cell controller 87 in turn receives that signal and reacts accordingly. The cell controller's reaction to a threshold signal indicating the charge mode is to close (i.e., switch it to its closed state) the power switch 75 and the charge switch 92 to provide a flow of electrical power from the cell 80 to the load 12.

If the cell is in maintenance or a non-ready mode, including not being ready for charging, the bypass switch 85 will be closed causing the cell to be bypassed wherein no power is provide to the cell. In that case, the controller need not close the power switch 75 and the charge switch 92. Again, it is preferred (but optional) that it not do that, as such connections may permit some connectivity between the cell and the series.

As a result of that threshold signal indicating the charge mode, this enables each cell available for charge to make the appropriate switching connections rapidly and in parallel simultaneously.

The bypass switching decision may be made by the cell controller 87 independently of the threshold signal reaction. Thus, the decision to place a given cell in bypass mode could have happened in advance, and reference to that decision is not intended to mean that the bypass switch action necessarily happens at the same time as the signaling to close the power and discharge/charge power switches 75, 90/92 happens. Some systems may have a configuration bias toward discharge or charge depending on the application. For example, as mentioned above, a system for backing up power to sensitive electronics, such as computers, may have an emphasis on rapid discharge, while a system for backing up a solar or wind farm may have an emphasis on rapid charging.

In systems where rapid discharge is a priority, the system may have a configuration bias towards keeping those cells not ready for discharge in a bypass state with the bypass switch 85 closed, and those that are ready for discharge in a normal state with the bypass switch 85 open. This is particularly useful where the cell ready state sensor(s) are used to identify cells that are ready for discharge but not ready for charge (e.g., a full cell that requires no further charging) and vice versa. Where discharging is more of a priority, the cell controllers 87 can be configured to set the bypass switches 85 in anticipation that discharge will be requested. This allows the system to react more rapidly when the threshold signal indicating a discharge mode is sent because the bypassing switches 85 have already been set in the correct positions, and the only action needed is closure of the power and discharge switches 75, 90.

Likewise, in systems where rapid charge is a priority, the system may have a configuration bias towards keeping those cells not ready for charging in a bypass state with the bypass switch 85 closed, and those that are ready for charging in a normal state with the bypass switch 85 open. This is particularly useful where the cell ready state sensor(s) are used to identify cells that are ready for charging but not ready for discharge (e.g., a depleted cell that cannot discharge further and needs to be charged) and vice versa. Where charging is more of a priority, the cell controllers 87 can be configured to set the bypass switches in anticipation that charging will be requested. This allows the system to react more rapidly when the threshold signal indicating a charge mode is sent because the bypassing switches have already been set in the correct positions, and the only action needed is closure of the power and charge switches 75, 92.

Other system may have no configuration bias towards charge or discharge.

Figure 6:
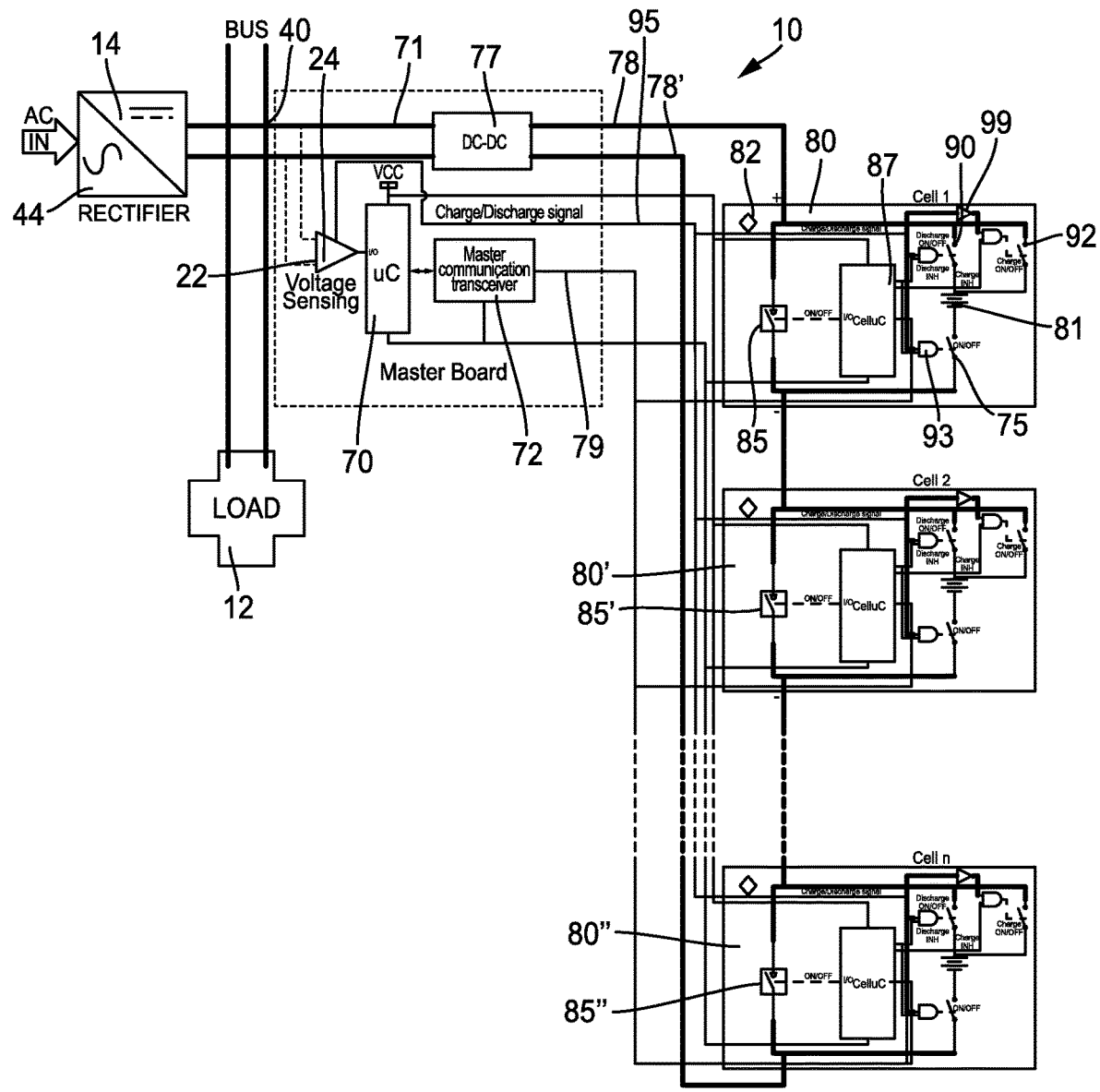
FIG. 6 shows an exemplary back-up power supply system embodiment of the invention coupled to a load and configured to measure voltage of a primary power supply by a voltage sensor that is hard wired to each of the cells.
Figure 7:
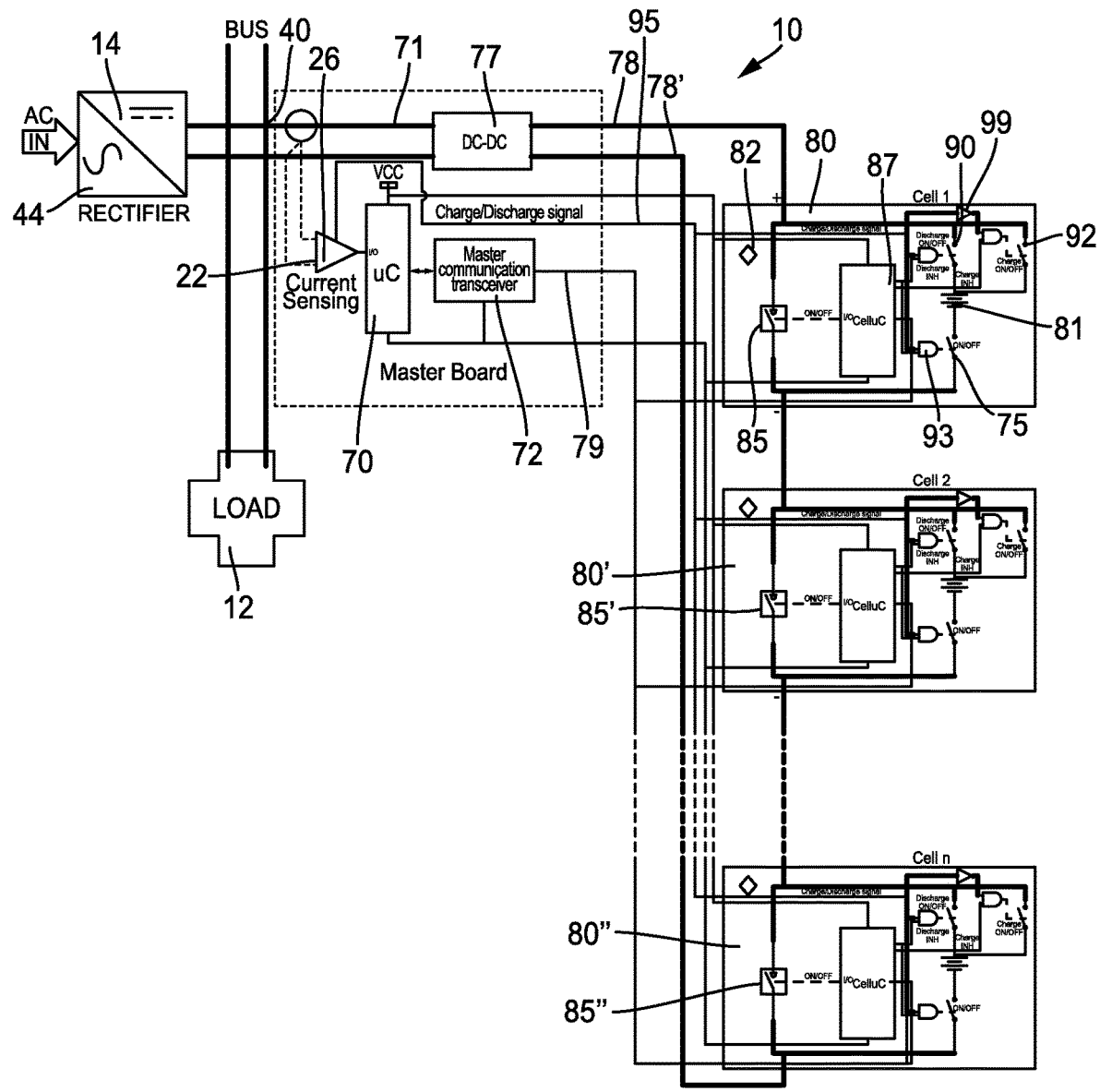
FIG. 7 shows an exemplary back-up power supply system embodiment of the invention coupled to a load and configured to measure current of a primary power supply by a current sensor that is hard wired to each of the cells.
Figure 8:
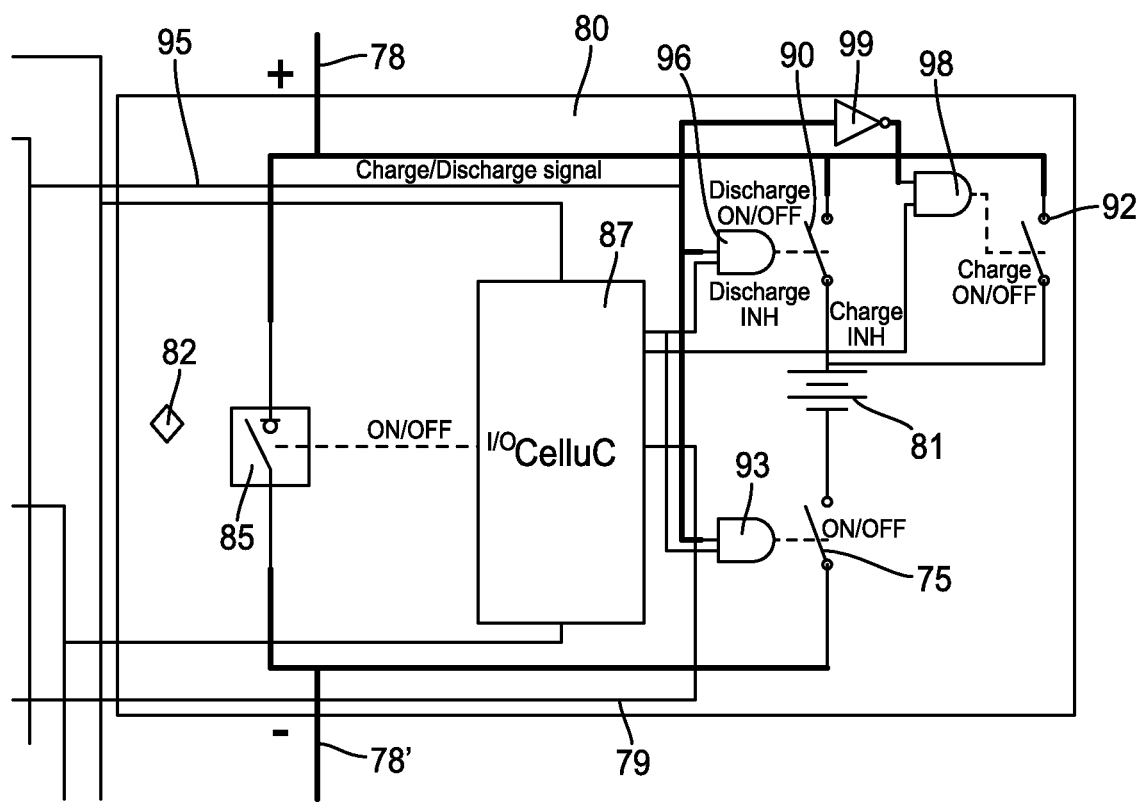
FIG. 8 shows a diagram of an exemplary cell having a microcontroller, and a plurality of switches, a discharge switch and charge switch and wherein the primary power supply sensor is hard wired to the cell.

Referring now to FIGS. 6 to 8, an additional back-up power supply system 10 is coupled to a load 12 and configured to measure a power level of a primary power supply 14 by a primary power source sensor 22. In FIG. 6, the primary power source sensor 22 is a voltage sensor 24, and in FIG. 7 the primary power source sensor 22 is a current sensor 26. The system design is the same as in FIGS. 4 and 5, except that the sensor 24/26 is coupled in parallel to a discharge control circuit 96 and a charge control circuit 98 of each cell for transmitting the threshold signal directly thereto. These circuits 96, 98 control the discharge and charge switches 90, 92, respectively, and the direct connection enables extremely rapid response to close the appropriate switch.

The discharge control circuit 96 may be designed as an AND gate. The AND gate has a first input connected to the primary power source sensor 24/26 for receipt of the appropriate threshold signal. That is, the primary power source sensor 24/26 is coupled in parallel to the discharge control circuit 96 of each cell, and particularly to the first input of the AND gate in the illustrated embodiment, for transmitting the threshold signal directly thereto. The AND gate of the discharge control circuit 96 also has a second input connected to the cell controller 87 to receive a signal indicating whether the cell is in a ready discharge state. The discharge control circuit 96 is configured to switch the discharge switch 90 to the closed state in response to two conditions being met: receiving the threshold signal indicating a discharge mode at the first input and a ready discharge signal from the cell controller 87 at the second input indicating the cell is in a ready discharge state. If both conditions are met the discharge control circuit 96 will close the discharge switch 90.

The charge control circuit 98 may also be designed as an AND gate. The AND gate also has a first input connected to the primary power source sensor 24/26 for receipt of the appropriate threshold signal. That is, the primary power source sensor 24/26 is coupled in parallel to the charge control circuit 98 of each cell, and particularly to the first input of the AND gate in the illustrated embodiment, for transmitting the threshold signal directly thereto. The AND gate of the charge control circuit 98 also has a second input connected to the cell controller 87 to receive a signal indicating whether the cell is in a ready charge state. The charge control circuit 98 is configured to switch the charge switch 92 to the closed state in response to two conditions being met: receiving the threshold signal indicating a charge mode at the first input and a ready charge signal from the cell controller 87 at the second input indicating the cell is in a ready discharge state. If both conditions are met the charge control circuit 98 will close the charge switch 92.

An inverter gate 99 prevents both switches 90, 92 from being activated at the same time wherein only one of the discharge and charge switch can be closed at a time.

Similarly, the power switch 75 may also have a power switch control circuit 93 for controlling the power switch 75. The power source sensor 24/26 may be communicated directly to the power source control circuit 93 in parallel to the other elements. The power switch control circuit 93 may also be designed as an AND gate. The AND gate also has a first input connected to the primary power source sensor 24/26 for receipt of the appropriate threshold signal. That is, the primary power source sensor 24/26 is coupled in parallel to the power switch control circuit 93 of each cell, and particularly to the first input of the AND gate in the illustrated embodiment, for transmitting the threshold signal directly thereto. The AND gate of the power switch control circuit 93 also has a second input connected to the cell controller 87 to receive a signal indicating whether the cell is in a ready state. The power switch control circuit 93 is configured to switch the charge switch 92 to the closed state in response to two conditions being met: receiving any threshold signal indicating a discharge or charge mode at the first input and a ready signal from the cell controller 87 at the second input indicating the cell is in a ready state, i.e. not in bypass. If both conditions are met the power switch control circuit 93 will close the power switch 75.

In some embodiments, the signal applied to the second input of the power switch control circuit AND gate may be a generic ready signal, i.e., a signal output for by the cell controller that indicates to the power switch control circuit 93 that the cell is ready for the power switch 75 to be closed (but does not differentiate between ready for charge and ready for discharge). In some embodiments, the signal applied to the second input control circuit AND gate may differentiate between the two states, i.e, be a ready discharge signal or a ready charge signal. The power switch control circuit 93 may be configured to react to either of those signals (assuming a threshold signal is also received). It is also possible to use multiple components, such as an AND gate that closes the power switch 75 when both a ready discharge signal from the cell controller 87 and a threshold signal indicating discharge mode is received, and an AND gate that closes the power switch 75 when both a ready charge signal from the cell controller and a threshold signal indicating charge mode is received. Thus, the use of a singular AND gate is not limiting, and other fast acting circuits may be used as well.

This direct communication and circuit driven switching in FIGS. 6-8 provides very fast responsiveness to a primary power source dropping below a threshold level.

In an embodiment, the back-up power supply system 10 may be coupled to a load 12 configured to receive AC power.

An inverter is used to convert DC power from the primary power source 14, e.g., a solar panel, to AC power. The same inverter (or a different one) will convert DC power produced by the back-up power supply system to AC power for application to the load when the primary power supply drops below a threshold power level.

Figure 9:
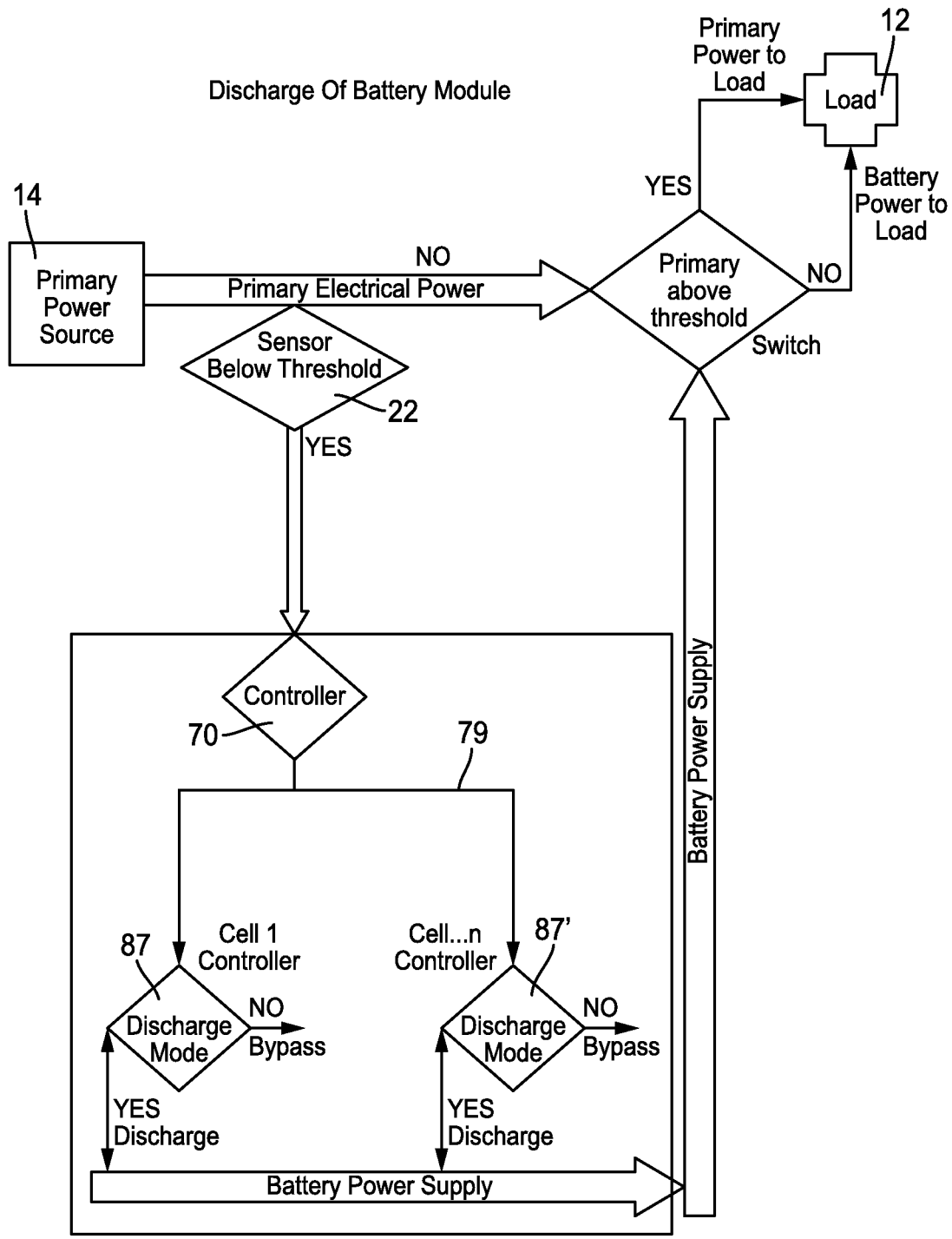
FIG. 9 shows an exemplary control diagram for an exemplary back-up power supply system that connects cells that are in a ready discharge mode to the load, to supply power to the load when the sensor detects that the primary power source is below a threshold level; wherein the sensor is connected with a controller that communicates with each of the cells.

In some embodiments, the cell may not have charge/discharge switches that couple separate electrodes to the circuit for discharging and charging functions. For example, some battery cells (e.g., lithium ion and lead acid batteries) only have an anode and a cathode and can be discharged and charged using the same electrodes by simply reversing the polarity. However, because it may be desirable to take such cells off-line for maintenance/defect purposes without interrupting the entire series, those cells can have the same power switch 75 and by-pass switch 85 as the previously discussed embodiments, with no need for multiple switches to toggle between different electrodes for charge and discharge purposes. It is also possible to have two power switches, one for the anode and one for the cathode of such a cell to ensure the cell is completely isolated from the series. The connection, configuration, and responsiveness of such switches on cells having only an anode and a cathode are the same as those discussed above, As shown in the control diagram of FIG. 9, an exemplary back-up power supply system 10 connects cells that are in a ready discharge mode to the load to supply battery power to the load when the sensor detects that the primary power source is below a threshold level. The primary power source sensor 22 communicates with a battery system controller which then communicates with each of the cells.

Figure 10:
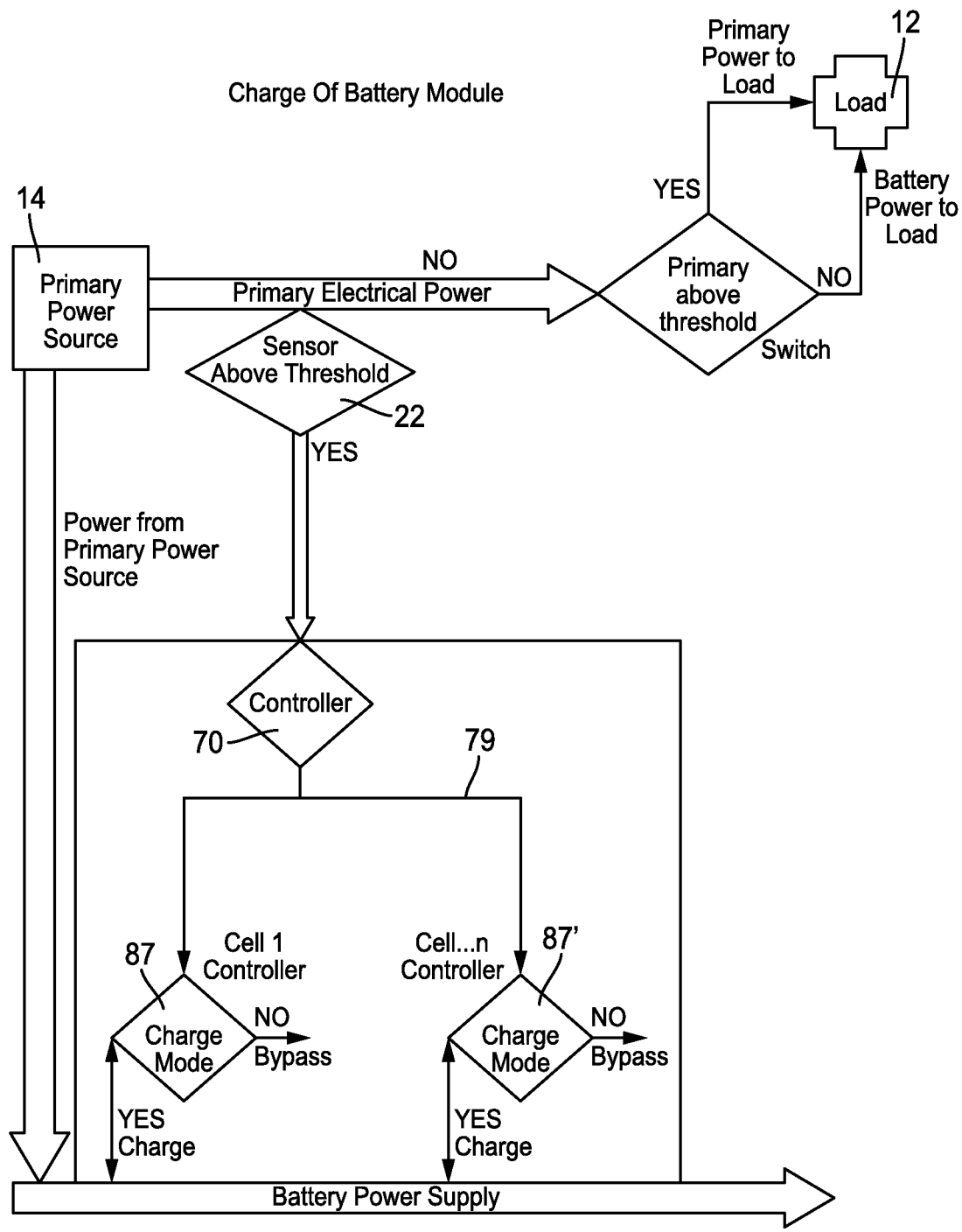
FIG. 10 shows an exemplary control diagram for an exemplary back-up power supply system that connects cells that are in a ready charge mode to the primary power supply when the sensor detects that the primary power source is above a threshold level; wherein the sensor is connected with a controller that communicates with each of the cells.

As shown in the control diagram of FIG. 10, an exemplary back-up power supply system 10 connects the primary power supply to the cells that are in a ready charge mode to supply primary power to the cells when the sensor detects that the primary power source is above a threshold level. The primary power source sensor 22 communicates with a battery system controller which then communicates with each of the cells.

Figure 11:
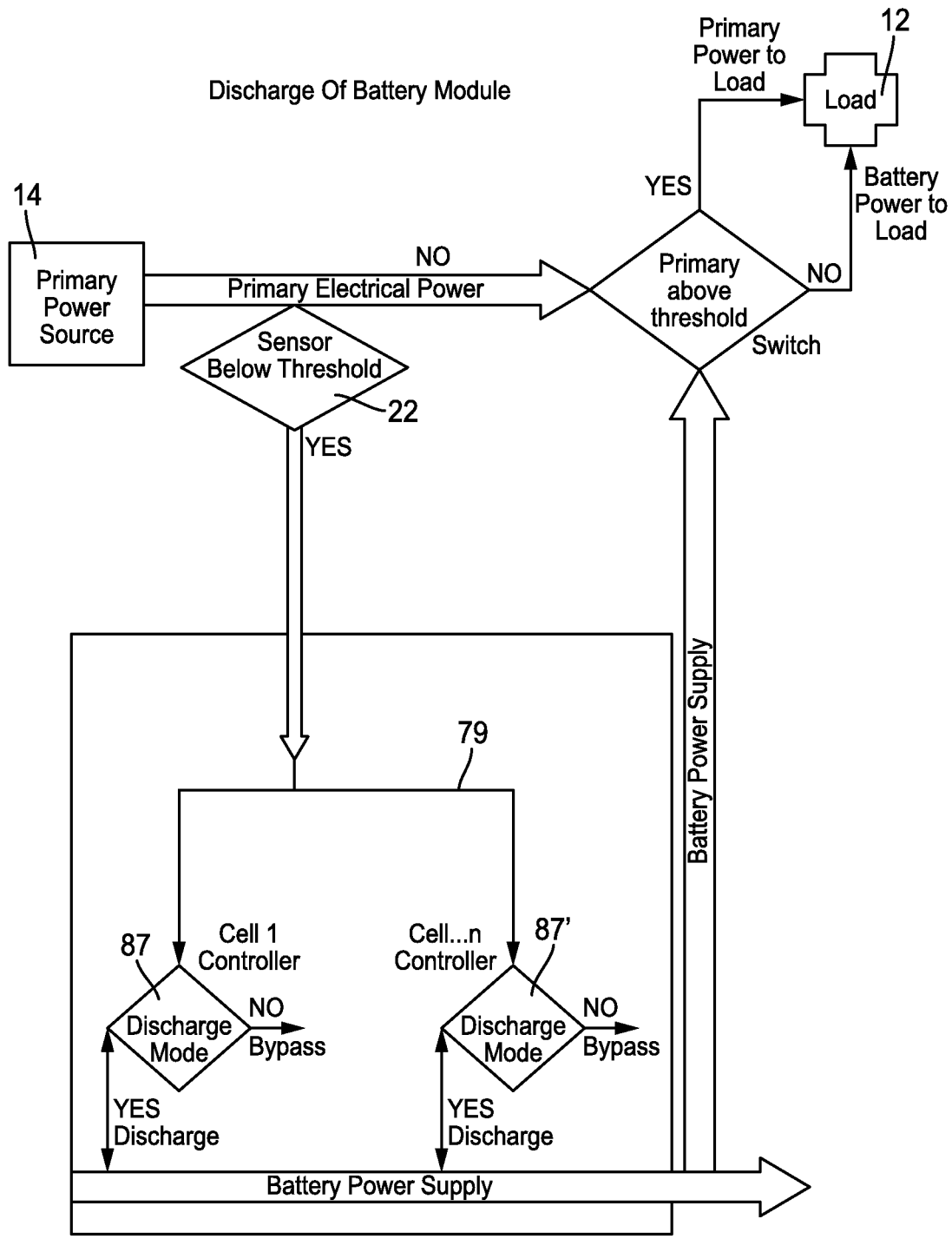
FIG. 11 shows an exemplary control diagram for an exemplary back-up power supply system that connects cells that are in a ready discharge mode to the load, to supply power to the load when the sensor detects that the primary power source is below a threshold level; wherein the sensor is connected directly with each of the cells.

As shown in the control diagram of FIG. 11, an exemplary back-up power supply system 10 connects cells that are in a ready discharge mode to the load, to supply battery power to the load when the sensor detects that the primary power source is below a threshold level. The primary power source sensor 22 communicates directly with the cells.

Figure 12:
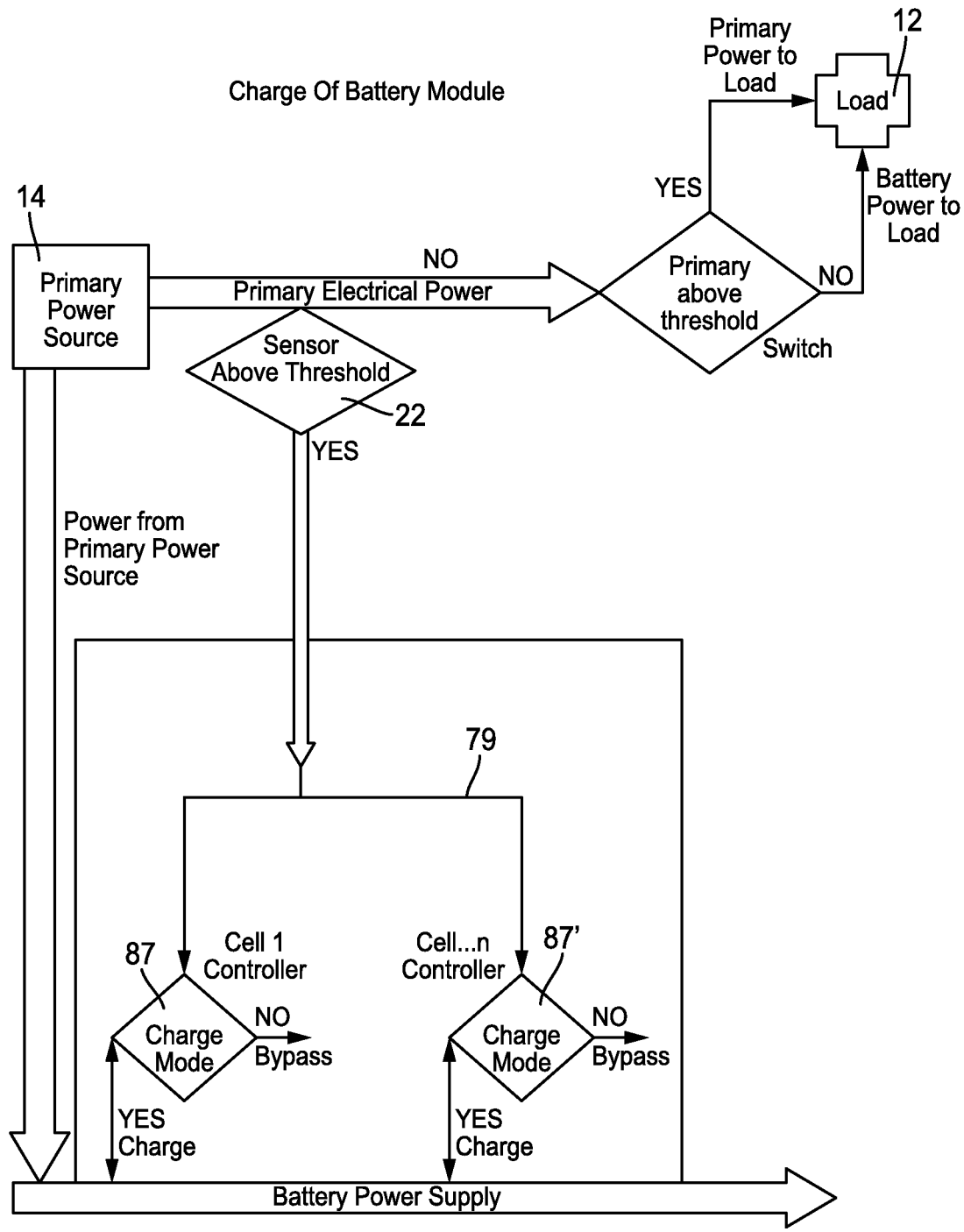
FIG. 12 shows an exemplary control diagram for an exemplary back-up power supply system that connects cells that are in a ready charge mode to the primary power supply when the sensor detects that the primary power source is above a threshold level; wherein the sensor is connected directly with each of the cells.

As shown in the control diagram of FIG. 12, an exemplary back-up power supply system 10 connects the primary power supply to the cells that are in a ready charge mode to supply primary power to the cells when the sensor detects that the primary power source is above a threshold level. The primary power source sensor 22 communicates directly with the cells, such as to control circuits or directly with the cell controllers.

Referring now to FIGS. 13 and 14, various portions of the electrochemical cell 100 may be of any suitable structure or composition, including but not limited to being formed from plastic, metal, resin, or combinations thereof. Accordingly, the cell 100 may be assembled in any manner, including being formed from a plurality of elements, being integrally molded, or so on. In various embodiments the cell 100 and/or the housing 110 may include elements or arrangements from one or more of U.S. Pat. Nos. 8,168,337, 8,309,259, 8,491,763, 8,492,052, 8,659,268, 8,877,391, 8,895,197, 8,906,563, 8,911,910, 9,269,996, 9,269,998 and U.S. Patent Application Publication Nos. 20100316935, 20110070506, 20110250512, 20120015264, 20120068667, 20120202127, 20120321969, 20130095393, 20130115523, and 20130115525, each of which are incorporated herein in their entireties by reference.

FIG. 13 illustrates a schematic cross sectional view of an electrochemical cell 100. As shown, the components of the electrochemical cell 100 may be contained at least partially in an associated housing 110. The cell 100 utilizes a liquid ionically conductive medium 124, such as an electrolyte 126 that is contained within the housing 110, and is configured to circulate therein to conduct ions within the cell 100. While at times the ionically conductive medium may be generally stationary within the housing 110, such as in a stagnant zone, it may be appreciated that the cell 100 may be configured to create a convective flow of the ionically conductive medium. In some embodiments, the flow of the ionically conductive medium may be a convective flow generated by bubbles of evolved gas in the cell 100, such as is described in U.S. patent application Ser. No. 13/532,374 incorporated above in its entirety by reference Although in the illustrated embodiment of FIG. 13 the cell housing is configured such that the oxidant reduction electrode 150 is immersed with the oxidant reduction electrode module 160 into the cell chamber 120, it may be appreciated that in various embodiments, other configurations or arrangements of the cell 100 are also possible. For example, in FIG. 14, another embodiment of the cell 100 (specifically, cell 100*) is presented, whereby an oxidant reduction electrode 150* defines a boundary wall for the cell chamber 120, and is sealed to a portion of a housing 110* so as to prevent seepage of ionically conductive medium therebetween. Such a configuration is generally not preferred, however, due to concerns that a failure of the oxidant reduction electrode 150* would result in leakage of the ionically conductive medium out of the cell 100*. Regardless, in some such embodiments the convective flow of the ionically conductive medium in the cell chamber 120, described in greater detail below, may be in a direction upwards and away from the oxidant reduction electrode 150*, across the top of the fuel electrode 130.

Preferably, systems in accordance with embodiments of the invention may complete switching within 10 ms or less of the power source sensor 22 detecting an applicable threshold being passed. More preferably, the time period is 5 ms or less, or even 2 ms or less.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A back-up power supply system for use in conjunction with a primary electrical power source, the system comprising:

a primary power sensor configured to detect a characteristic of primary electrical power provided by the primary electrical power source to a load, the primary power sensor being configured to output a threshold signal, the threshold signal indicating a discharge mode or a charge mode based on the characteristic detected;

a system controller;

a battery system comprising a plurality of rechargeable battery cells arranged in series, each cell comprising:

(i) a cell controller;

(ii) at least one ready state sensor coupled to the cell controller for sensing one or more conditions of the cell for determining if the rechargeable battery cell is in a ready charge mode for charging, and if the rechargeable battery cell is in a ready discharge mode for discharging;

(iii) a cell bypass switch coupled to the cell controller, the cell bypass switch being switchable between a normal state for enabling said cell to be electrically coupled in said series and a bypass state bypassing the cell within the series; and (iv) a power switch switchable between a closed state electrically coupling the battery within the series to communicate power between the battery and the load and an open state electrically decoupling the battery cell from the series;

wherein the system controller is coupled to each cell controller and each cell controller is configured to receive communication signals from the system controller;

wherein the primary power sensor is electrically coupled in parallel to the system controller and to each cell for bypassing the system controller and transmitting the threshold signal directly thereto;

wherein each cell is configured to switch its respective power switch to said closed state in response to receiving the threshold signal;

wherein each cell controller is configured to switch said bypass switch between said bypass state and said normal state in response to said at least one ready state sensor.

2. The backup power supply system of claim 1, wherein said cell controller is configured to switch said bypass switch between the normal state and the bypass state independently of the threshold signal.

3. The backup power supply system of claim 1, wherein each cell comprises a fuel electrode, a cathode, and a charging electrode, each cell further comprising:

a discharge switch switchable between a closed position for coupling the cell to the series by the cathode for discharging the cell and an open position for decoupling the cathode from the series, and a charge switch switchable between a closed position for coupling the cell to the series by the charging electrode for charging and an open position for decoupling the charging electrode from the series, wherein each cell is also configured to switch the discharge switch to the closed position thereof in response to the threshold signal indicating the discharge mode and to switch the charge switch to the closed position in response to the threshold signal indicating the charge mode.

4. The backup power supply system of claim 3, wherein the cell controller is configured to switch said bypass switch between said normal state and said bypass state independently of said threshold signal.

5. The backup power supply system of claim 3, wherein the primary power sensor is coupled in parallel to the cell controller of each cell for transmitting the threshold signal directly thereto, each cell controller being configured to (a) switch the power switch and the discharge switch to the closed states thereof in response to the threshold signal indicating the discharge mode and (b) switch the power switch and the charge switch to the closed states thereof in response to the threshold signal indicating the charge mode.

6. The backup power supply system of claim 5, wherein each cell controller has an interrupt input and the primary power sensor is coupled in parallel to the interrupt input of the cell controller of each cell.

7. The backup power supply system of claim 3, wherein each cell has a discharge control circuit coupled to the cell controller thereof and a charge control circuit coupled to the cell controller thereof, wherein the primary power sensor is coupled in parallel to the discharge control circuit and the charge control circuit of each cell for transmitting the threshold signal directly thereto;

wherein each discharge control circuit is configured to switch the discharge switch to the closed state thereof in response to receiving the threshold signal indicating the discharge mode and a ready discharge signal from the cell controller indicating the cell is in a ready discharge state;

wherein each charge control circuit is configured to switch the charge switch to the closed state thereof in response to receiving the threshold signal indicating the charge mode and a ready charge signal from the cell controller indicating the cell is in a ready charge state.

8. The backup power supply system of claim 7, wherein each cell further comprises an inverter between the discharge and charge control circuits for preventing simultaneous closure of the charge and discharge switches.

9. The backup power supply system of claim 7, further comprising a power switch control circuit coupled to the cell controller thereof, wherein the primary power sensor is coupled in parallel to the power switch control circuit for transmitting the threshold signal directly thereto;

wherein the power switch control circuit is configured to switch the power switch to the closed state thereof in response to receiving the threshold signal indicating the discharge mode and a ready discharge signal from the cell controller indicating the cell is in a ready discharge state; and wherein the power switch control circuit is configured to switch the power switch to the closed state thereof in response to receiving the threshold signal indicating the charge mode and a ready charge signal from the cell controller indicating the cell is in a ready charge state.

10. The backup power supply system of claim 3, wherein each of the battery cells is a metal-air battery with the fuel electrode comprising a metal fuel electrode comprising a metal fuel and the cathode comprising an air cathode.

11. The backup power supply system of claim 10, wherein the charging electrode of each metal-air battery is an oxygen evolving electrode.

12. The backup power supply sys of claim 10, wherein the metal fuel comprises zinc.

13. The backup power supply system of claim 1, wherein the primary power sensor is a voltage sensor.

14. The backup power supply system of claim 1, wherein the primary power sensor is a current sensor.

* * * * *